United States Patent [19]

Marlett et al.

[11] Patent Number: 4,753,740

[45] Date of Patent: Jun. 28, 1988

[54] ANTIFLOCCULATING AGENTS FOR METAL HALIDE SOLUTIONS

[75] Inventors: Everett M. Marlett; Warren B. Kirsch, both of Baton Rouge, La.; Bonnie G. McKinnie, Magnolia, Ark.

[73] Assignee: Ethyl Corporation, Richmond, Va.

[21] Appl. No.: 642,538

[22] Filed: Aug. 20, 1984

[51] Int. Cl.$^4$ .................. C23G 1/02; E21B 43/27
[52] U.S. Cl. .................. 252/8.55; 423/208; 423/277; 134/41
[58] Field of Search .......... 252/8.55 R, 363.5, 8.55 B, 252/8.55 C; 134/136, 41; 423/155, 158, 162, 163, 179, 184, 191, 197, 202, 204, 205, 208, 276, 277, 289

[56] References Cited

U.S. PATENT DOCUMENTS

| | | | |
|---|---|---|---|
| 4,330,419 | 5/1982 | Hall et al. | 252/8.55 B |
| 4,336,156 | 6/1982 | Quinlan | 252/8.55 R |
| 4,350,601 | 9/1982 | Mosier et al. | 252/8.55 R |
| 4,415,463 | 11/1983 | Mosier et al. | 252/8.55 R |
| 4,526,693 | 7/1985 | Son et al. | 252/8.5 B |

Primary Examiner—Barry S. Richman
Assistant Examiner—T. J. Wallen
Attorney, Agent, or Firm—J. D. Odenweller; E. E. Spielman, Jr.

[57] ABSTRACT

A process for making a dry metal halide salt which will not form an insoluble flocculent material upon dissolving in water in which an initial aqueous solution of a metal halide salt is prepared and a member selected from the group consisting of ammonium chloride, ammonium bromide, borate anion producing compounds and mixtures thereof is added. Water is then evaporated from the initial aqueous solution and a dry metal halide salt is obtained. Upon dissolving this dry metal halide salt in water a clear, colorless solution results which does not contain an insoluble flocculent material. Alternatively, the member compound may be added to the dry metal halide salt, before it is dissolved in water or the member compound may be added to the water which is used to dissolve the dry metal halide salt.

35 Claims, No Drawings

ANTIFLOCCULATING AGENTS FOR METAL HALIDE SOLUTIONS

BACKGROUND OF THE INVENTION

1. Field of the Invention

The present invention is directed to a method for forming a dry metal halide salt which will form a clear colorless solution upon dissolving in water. More particularly, this invention is concerned with preventing the formation of an insoluble flocculent material upon dissolving a dry metal halide salt in water.

2. Description of the Prior Art

Clear, high density brines are used in oil well completions and workovers. They are also used as oil well packer fluids. Packer fluids are the fluids which are left in the annular space between the tubing and casing of oil wells. The primary purpose of these fluids is to balance the pressure in the well so as to prevent a well "blow out" without losing the fluid to the formation, and without damaging the formation as is done when solids-laden fluids are used. The densities required by these brines are determined by the well pressures and depths.

Brine is typically defined as water which is nearly saturated with salts. Oil well brines are usually prepared by blending different amounts and types of salt solutions to get the required density and clarity at the lowest cost. Such brines must be clear, that is, free of solids or solids-forming materials.

Calcium bromide has traditionally been available as a liquid, that is, commercial sale of calcium bromide has usually been as a brine. At the well site the density of the brine could be decreased by adding more water. Shipping costs over large distances were higher than necessary since much of the brine was water. By shipping dry metal halide salts shipping costs can be minimized. The salt can then be dissolved in water by the driller at the well site to form brine of the required density.

Metal halides used in completion fluids are made in an aqueous medium by reaction of a metal base such as CaO, Ca(OH)$_2$, ZnO and the like with HCl, HBr or Br$_2$ with a reducing agent such as methanol. The dry metal halides are made by evaporating the water from these initial solutions. However, it was discovered that upon redissolving the dry salt, an insoluble flocculent material was formed. This insoluble flocculent material is undesirable for oil well completion fluids because it may damage the well formation. The cause of the floc may have originated in the brine manufacturing process. Alternatively, floc-causing impurities may have been acquired by the solution during shipping, storage or handling.

SUMMARY OF THE INVENTION

According to the present invention, a member of the group consisting of ammonium chloride, ammonium bromide, borate anion producing compounds and mixtures thereof are added to an initial aqueous solution of a metal halide. Water is evaporated from the initial aqueous solution to obtain a dry metal halide salt. Upon dissolving the dry metal halide salt in water, a clear, colorless solution is obtained without the presence of an insoluble flocculent material. Alternatively, the member compound may be added to the dry metal halide salt before it is dissolved in water or the member compound may be added to the water which is used to dissolve the dry metal halide salt.

DESCRIPTION OF THE PREFERRED EMBODIMENTS

A preferred embodiment of the invention is a process for making a dry metal halide salt which will not form an insoluble flocculent material upon dissolving in water, said metal halide salt being selected from the group consisting of calcium bromide, calcium chloride, zinc bromide, zinc chloride, sodium chloride, sodium bromide, potassium chloride, potassium bromide, barium bromide, strontium bromide and mixtures thereof and containing an impurity which would normally form an insoluble flocculent material when said dry metal halide salt(s) is dissolved in water, said dry metal halide salt(s) being obtained by evaporating the water from an initial aqueous solution of said metal halide(s), said process comprising adding a member selected from the group consisting of ammonium chloride, ammonium bromide, borate anion producing compounds and mixtures thereof to said initial aqueous solution of said metal halide(s) and evaporating the water from said initial aqueous solution of said metal halide(s) containing said member to obtain said dry metal halide salt(s) which will not form said insoluble flocculent material when said dry metal halide salt(s) is dissolved in water.

Another embodiment of the invention is a process for preparing a metal halide salt(s) solution which does not contain an insoluble flocculent material from a dry metal halide salt(s) said metal halide salt being selected from the group consisting of calcium bromide, calcium chloride, zinc bromide, zinc chloride, sodium chloride, sodium bromide, potassium chloride, potassium bromide, barium bromide, strontium bromide and mixtures thereof, and containing an impurity which would normally form an insoluble flocculent material when said dry metal halide salt(s) is dissolved in water, said process comprising adding a member selected from the group consisting of ammonium chloride, ammonium bromide, borate anion producing compounds and mixtures thereof to said dry metal halide salt(s) and dissolving said dry metal halide salt containing said member in water.

A further embodiment of the present invention is a process for making a metal halide salt(s) solution which does not contain an insoluble flocculent material from a dry metal halide salt(s) said metal halide salt being selected from the group consisting of calcium bromide, calcium chloride, zinc bromide, zinc chloride, sodium chloride, sodium bromide, potassium chloride, potassium bromide, barium bromide, strontium bromide and mixtures thereof and containing an impurity which would normally form an insoluble flocculent material when said dry metal halide salt(s) is dissolved in water, said process comprising adding a member selected from the group consisting of ammonium chloride, ammonium bromide, borate anion producing compounds and mixtures thereof to water in an amount which provides in the range of about 100 to about 20,000 parts per million of said member and dissolving said dry metal halide salt in said water containing said member.

Occasionally, when a dry metal halide salt is dissolved in water, flocculation is observed. Flocculation is defined as coagulation of a finely divided precipitate. Flocculent material has either a white or a light yellow color and is composed of small, fine particles.

Typical salts found in brine used in oil wells include calcium bromide, calcium chloride, zinc bromide and zinc chloride. Additional salts which may be used include sodium chloride, sodium bromide, potassium chloride, potassium bromide, barium bromide, strontium bromide and mixtures thereof. A variety of salts are generally used to obtain the desired density of the final solution. The amount of each salt used is limited by the solubility of that salt in the aqueous media. The presence of a solid or precipitated salt in the oil well brine could damage the oil well formation thus all the metal halide salts must be in solution. Any of these metal halide salt solutions may be treated by the process of the present invention.

Analysis of flocculent material found in calcium bromide has indicated that it is primarily magnesium salts with trace amounts of iron, aluminum, zinc, manganese, calcium and silicon. These impurities may be introduced into the salt solutions in a number of ways. Different methods of preparing the metal halide salt solutions exist and this results in different types and amounts of flocculent material after evaporation to a dry state and dissolving in water. For instance, metal bromides such as calcium bromide can be prepared by contacting a basic calcium compound such as lime in an aqueous medium with bromine in the presence of an organic reducing agent such as a lower alkanol (e.g. methanol) or a lower aldehyde (e.g. formaldehyde) as a reducing agent. Calcium bromide brines can also be prepared by reacting hydrogen bromide and lime in water. Zinc brines can be made by reacting a basic zinc compound such as zinc oxide with a halogen acid such as HCl or HBr or the combination of $Br_2$ and an organic reducing agent (e.g. methanol, formaldehyde) in an aqueous medium. Barium and strontium bromides can be made similarly.

It was unexpectedly discovered that the formation of floc could be prevented if the dry salt was made by evaporating water from an initial aqueous solution of the metal halide salt to which a small amount of certain compounds had been added. The compounds are selected from the group consisting of ammonium chloride, ammonium bromide, borate anion producing compounds and mixtures thereof. Representative borate anion producing compounds include boric acid, borax, fluoroboric acid, ammonium fluoroborate, alkali metal borohydride, alkaline earth metal borohydride, boric oxide ($B_2O_3$), boron halides and mixtures thereof. Typical alkali metal borohydrides include sodium borohydride, potassium borohydride and the like. Typical alkaline earth metal borohydrides include calcium borohydride, zinc borohydride and the like. A suitable boron halide is boron trichloride. Based on convenience and cost, boric acid is generally preferred. The compound is added to the initial aqueous solution of the metal halide salt before the water is evaporated to obtain the dry metal halide salt. The amount of the compound used in the process of the present invention is sufficient to prevent the formation of an insoluble flocculent material upon dissolving the dry metal halide salt in water. The preferred amount of the compound is dictated by the amount and type of impurity present in the dry metal halide salt. A desirable range of the compound in the initial aqueous solution of the metal halide salt is from about 100 to about 20,000 parts per million. Preferably, the range is from about 300 to about 10,000 parts per million. Based on the dry metal halide salt, a desirable range is from about 200 to about 40,000 parts per million. Preferably, the range is from about 500 to about 20,000 parts per million. More preferably, the range is from about 1,000 to about 4,000 parts per million.

Alternatively the compound may be added to the dry metal halide salt before it is dissolved in water or the compound may be added to the water which is used to dissolve the dry metal halide salt.

The process can be conducted entirely at room temperature. However, depending on the compound added to the salt solution before drying, it may be advantageous to heat the salt solution to improve the solubility of the compound therein. For example, boric acid is only mildly soluble in water having a solubility of 3 grams per 100 grams of water and can be expected to be less soluble in saturated brines. The temperature is dependent on a number of factors including the amount of the compound to be added to the solution. No particular process temperature is preferred. However, the typical process temperature ranges from about 60° F. to about 200° F. More typically, the temperature ranges from about 80° F. to about 180° F.

In general, the process is conducted under ambient pressures since these are most economical. However, the pressure is not critical. The time is also not critical, but depends to some extent on the solubility of the compound in the salt solution. The mixture should be stirred for a time sufficient to dissolve the selected compound in the metal halide salt solution before evaporating the water.

Any type of drying technique may be used to convert the initial metal halide salt solution to a dry metal halide salt. Typical drying techniques include direct dryers, indirect dryers, infrared heat dryers or radiant heat dryers.

In direct dryers, the heat transfer for drying is accomplished by direct contact between the wet solid and hot gases. The vaporized liquid is carried away by the hot gases. These are sometimes referred to as convection dryers. Direct batch dryers are designed to operate on a definite size batch of wet feed for given time cycles. In batch dryers the moisture content and conditions continuously changes. In the continuous batch dryers, the process is continued without interruption as long as wet feed is supplied. Typical direct continuous dryers include continuous tray dryers, continuous sheeting dryers, spray dryers, through-circulation dryers and tunnel dryers.

In the indirect dryers, the heat for drying is transferred to the wet solid through a retaining wall. The vaporized liquid is removed independently of the heating medium. The rate of drying depends on the contact of the wet material with the hot surfaces. Typical types of indirect batch dryers include agitated gas dryers, freeze dryers, vacuum rotary dryers and vacuum tray dryers. Typical indirect continuous dryers include cylinder dryers, drum dryers, screw conveyor dryers, steam tube rotary dryers and vibrating tray dryers.

The preferred drying technique for the present process is spray drying. Spray drying is an almost instantaneous means of producing dry product from a solution or slurry. This is accomplished by reducing the liquid to a fine spray, mixing it with a stream of hot gas and then separating the dried powder from the gas. The gas supplies the heat for evaporation and carries off the moisture. The heart of the operation is atomization of feed into the drying chamber by a spray nozzle or centrifugal atomizer, after heated air contacts the fine spray to give rapid drying. Of the various spray drying techniques, a rotary atomizer is preferred. Temperatures within the chamber can oftentimes reach 1000° F. Thus, the compound selected must have good heat stability to withstand extreme temperatures.

The following examples illustrate the process of the present invention. These examples are in no manner intended to limit the invention described. A standard method of pH determination was used in the following examples. The sample solution was diluted 10:1 with distilled water. The distilled water previously had its pH adjusted to 7 and then the pH of the diluted sample was taken and reported as the pH of the solution.

EXAMPLE 1

Preparation of Calcium Bromide Solution

A reactor was charged with 25 parts by weight of water. The following ingredients were then added to the reactor in five equal portions: 20 parts lime, 2.0 parts methanol, 29 parts bromine and 16 parts of 56% aqueous HBr. The ingredients are listed in order of addition. Each portion of bromine was added over about one hour at a temperature of about 175° F. to about 225° F. An additional 0.83 parts of 56% HBr was then added and stirring continued for about one-half hour. The pH of a filtered sample was 5.8. Following this, 0.18 parts of 25% NaOH was added and stirring continued for another fifteen minutes. The reaction mixture was filtered. The clear product had a pH of 7.8 and a density of about 15.35 lb./gallon.

EXAMPLE 2

Analysis of the Flocculent Material

Two quarts of a calcium bromide solution prepared in the manner described by Example 1 was dried by evaporation in a beaker and then redissolved with water. A precipitate was formed that was beige to faint orange in color. The solid was separated by filtration and resuspended in about 100 mL of water. The sample was filtered again and the solid was oven-dried at 120° C. for about two hours. The solid sample weighed 0.27 gram.

The sample was analyzed by emission spectrometry. The following results were obtained: 22% magnesium, 2.4% manganese, 1.8% calcium, 1 to 5% silicon, 1 to 3% zinc, 0.9% iron and 0.5% aluminum.

EXAMPLE 3

Treatment With Ammonium Chloride

To approximately 340 grams of a solution of calcium bromide prepared in a similar manner to that described in Example 1 having a density of about 14.2 lb./gallon and a pH of 7.6 was added about 0.85 gram of ammonium chloride ($NH_4Cl$). The calcium bromide solution was evaporated to dryness and redissolved with water. The final calcium bromide solution was perfectly clear and colorless and had a pH of 7.7. No change was observed after three days.

EXAMPLE 4

Treatment With Sodium Borohydride

To approximately 400 grams of the calcium bromide stock solution prepared as in Example 3 was added about 0.5 gram sodium borohydride ($NaBH_4$). The calcium bromide solution was filtered, dried and redissolved with water. The final calcium bromide solution was clear and colorless and had a pH of 8.4. No change was observed after three days.

EXAMPLE 5

Treatment With Ammonium Chloride

To approximately 150 mL of a calcium bromide solution prepared in a similar manner to that described in Example 1 having a density of about 15.6 lbs./gallon and a pH of 7.8 was added about 1.1 gram ammonium chloride. The calcium bromide solution was evaporated and redissolved with water. The final calcium bromide solution was clear and colorless and had a pH of 7.7. No change was observed after three days.

EXAMPLE 6

Treatment With Ammonium Chloride

Approximately 150 mL of the calcium bromide stock solution similar to that used in Example 5 having a pH of 7.7 was filtered. About 0.60 gram ammonium chloride was added and a pH of 7.35 was obtained. On drying and redissolving, the calcium bromide solution had a pH of 7.85 and was clear but faintly yellow.

EXAMPLE 7

Treatment With Ammonium Chloride

A 200 mL sample of the unfiltered calcium bromide stock solution used in Example 5 was treated with 0.70 gram ammonium chloride. The pH dropped from 7.8 to 7.35. The solution was bright yellow before drying. Upon redissolving with water, the calcium bromide solution was virtually colorless and solids-free having a pH of 8.0.

EXAMPLES 8–12

Samples of calcium bromide solution having a density of 14.2 lbs./gallon and a pH of 7.1 were treated as identified in Table I.

TABLE I

| Example | Additive | pH Before Drying | pH after Drying and Redissolving | Solids |
|---|---|---|---|---|
| 8 | None | 7.1 | 7.7 | floc |
| 9 | 1500 ppm $NH_4Cl$ | 7.0 | 7.7 | none |
| 10 | 4000 ppm $NH_4Cl$ | 6.9 | 7.5 | none |
| 11 | 1500 ppm $B(OH)_3$ | 6.7 | 7.6 | none |
| 12 | 4000 ppm $B(OH)_3$ | 6.5 | 7.5 | none |

As indicated by Table I, a solid precipitate or flocculent material appeared upon drying and redissolving the untreated calcium bromide solution. Treatment with either ammonium chloride ($NH_4Cl$) or boric acid ($B(OH)_3$) prevented floc formation upon redissolving with water.

EXAMPLE 13

Treatment With Boric Acid

Approximately 30 parts by weight of a calcium bromide solution having a density ranging from 14.2 to 15.6 lbs./gallon was heated to 130°–140° F. Approximately 100 parts of boric acid was then added. The mixture was stirred until the boric acid was dissolved. The mixture was added to approximately 750 parts of another calcium bromide solution having a density ranging from 14.2 to 15.6 lbs./gallon at a temperature of about 100° F. The entire system was stirred and then dried in a rotary atomizer. The chamber of the rotary atomizer had a temperature of about 900° F. and an exit temperature of about 500° F. Upon redissolving the resultant solid calcium bromide in water, a clear, colorless solution was obtained.

We claim:

1. A process for making a dry metal halide salt(s) which will not form an insoluble flocculent material upon dissolving in water, said metal halide salt being selected from the group consisting of calcium bromide, calcium chloride, zinc bromide, zinc chloride, sodium chloride, sodium bromide, potassium chloride, potassium bromide, barium bromide, strontium bromide and mixtures thereof and containing an impurity which would normally form an insoluble flocculent material when said dry metal halide salt(s) is dissolved in water, said dry metal halide salt(s) being obtained by evaporating the water from an initial aqueous solution of said metal halide(s), said process comprising:

(a) adding a member selected from the group consisting of ammonium chloride, ammonium bromide, borate anion producing compounds and mixtures thereof to said initial aqueous solution of said metal halide(s) and (b) evaporating the water from said initial aqueous solution of said metal halide(s) containing said member to obtain said dry metal halide salt(s) which will not form said insoluble flocculent material when said dry metal halide salt(s) is dissolved in water.

2. A process, as recited in claim 1, wherein said member is a borate anion producing compound selected from the group consisting of boric acid, borax, fluoroboric acid, ammonium fluoroborate, alkali metal borohydride, alkaline earth metal borohydride, boric oxide, boron halide and mixtures thereof.

3. A process, as recited in claim 1, wherein said metal halide in said initial aqueous solution is calcium chloride.

4. A process, as recited in claim 1, wherein said metal halide in said initial aqueous solution is calcium bromide.

5. A process, as recited in claim 1, wherein said member is ammonium chloride.

6. A process, as recited in claim 5, wherein said ammonium chloride is added in an amount which provides in the range of about 100 to about 20,000 parts per million in said initial aqueous solution.

7. A process, as recited in claim 1, wherein said member is boric acid.

8. A process, as recited in claim 7, wherein said boric acid is added in an amount which provides in the range of about 100 to about 20,000 parts per million in said initial aqueous solution.

9. A process, as recited in claim 8, wherein said boric acid is added in an amount which provides in the range of about 500 to about 10,000 parts per million in said initial aqueous solution.

10. A process for preparing dry calcium bromide which will not form an insoluble flocculent material upon dissolving in water, said process comprising:

(a) preparing an aqueous solution of calcium bromide, said calcium bromide solution being made by a process comprising reacting a member selected from the group consisting of calcium oxide, calcium hydroxide and mixtures thereof with an agent selected from the group consisting of (1) HBr, (2) Br$_2$ and an organic reducing agent and mixtures of (1) and (2) in an aqueous reaction medium;

(b) adding boric acid; and (c) drying said solution containing said boric acid to obtain said dry calcium bromide.

11. A process, as recited in claim 10, which includes the additional step of heating said calcium bromide solution to a temperature of about 60° F. to about 200° F. either before or after the addition of said boric acid to improve the solubility of said boric acid in said solution.

12. A process, as recited in claim 10, wherein said boric acid is added in an amount which provides about 100 to about 20,000 parts per million in said calcium bromide solution.

13. A process for preparing a metal halide salt(s) solution which does not contain an insoluble flocculent material from a dry metal halide salt(s) said metal halide salt being selected from the group consisting of calcium bromide, calcium chloride, zinc bromide, zinc chloride, sodium chloride, sodium bromide, potassium chloride, potassium bromide, barium bromide, strontium bromide and mixtures thereof, and containing an impurity which would normally form an insoluble flocculent material when said dry metal halide salt(s) is dissolved in water, said process comprising:

(a) adding a member selected from the group consisting of ammonium chloride, ammonium bromide, borate anion producing compounds and mixtures thereof to said dry metal halide salt(s); and (b) dissolving said dry metal halide salt containing said member in water.

14. A process, as recited in claim 13, wherein said member is a borate anion producing compound selected from the group consisting of boric acid, borax, fluoroboric acid, ammonium fluoroborate, alkali metal borohydride, alkaline earth metal borohydride, boric oxide, boron halide and mixtures thereof.

15. A process, as recited in claim 13, wherein said dry metal halide salt is calcium chloride.

16. A process, as recited in claim 13, wherein said dry metal halide salt is calcium bromide.

17. A process, as recited in claim 13, wherein said member is ammonium chloride.

18. A process, as recited in claim 17, wherein about 200 to about 40,000 parts per million, based upon the metal halide salt, of ammonium chloride is used.

19. A process, as recited in claim 13, wherein said member is boric acid.

20. A process, as recited in claim 19, wherein about 200 to about 40,000 parts per million, based upon the metal halide salt, of boric acid is used.

21. A process for making a metal halide salt(s) solution which does not contain an insoluble flocculent material from a dry metal halide salt(s) said metal halide salt being selected from the group consisting of calcium bromide, calcium chloride, zinc bromide, zinc chloride, sodium chloride, sodium bromide, potassium chloride, potassium bromide, barium bromide, strontium bromide and mixtures thereof and containing an impurity which would normally form an insoluble flocculent material when said dry metal halide salt(s) is dissolved in water, said process comprising:

(a) adding a member selected from the group consisting of ammonium chloride, ammonium bromide, borate anion producing compounds and mixtures thereof to water in an amount which provides in the range of about 100 to about 20,000 parts per million; and (b) dissolving said dry metal halide salt in said water containing said member.

22. A process, as recited in claim 21, wherein said member is a borate anion producing compound selected from the group consisting of boric acid, borax, fluoroboric acid, ammonium fluoroborate, alkali metal borohydride, alkaline earth metal borohydride, boric oxide, boron halide and mixtures thereof.

23. A process, as recited in claim 21, wherein said dry metal halide salt is calcium chloride.

24. A process, as recited in claim 21, wherein said dry metal halide salt is calcium bromide.

25. A process, as recited in claim 21, wherein said member is ammonium chloride.

26. A process, as recited in claim 25, wherein about 200 to about 40,000 parts per million, based upon the metal halide salt, of ammonium chloride is used.

27. A process, as recited in claim 21, wherein said member is boric acid.

28. A process, as recited in claim 27, wherein about 200 to about 40,000 parts per million, based upon the metal halide salt, of boric acid is used.

29. A metal halide composition which will not form an insoluble flocculent material when dissolved in water, said metal halide being selected from the group consisting of calcium bromide, calcium chloride, zinc bromide, zinc chloride, sodium chloride, sodium bromide, potassium chloride, potassium bromide, barium bromide, strontium bromide and mixtures thereof said composition containing about 200 to about 40,000 parts per million of a borate anion producing compound which is selected from the group consisting of boric acid, borax, fluoroboric acid, ammonium fluoroborate, alkali metal borohydride, alkaline earth metal borohydride, boric oxide, boron halide and mixtures thereof.

30. A metal halide composition of claim 29 wherein said metal halide is calcium bromide and said borate anion producing compound is boric acid.

31. A brine which does not contain an insoluble flocculent material comprising water, a metal halide salt(s) said metal halide salt being selected from the group consisting of calcium bromide, calcium chloride, zinc bromide, zinc chloride, sodium chloride, sodium bromide, potassium chloride, potassium bromide, barium bromide, strontium bromide and mixtures thereof and about 200 to about 40,000 parts per million, based upon the metal halide salt, of borate anion producing compound(s).

32. A brine, as recited in claim 31, wherein said member is a borate anion producing compound selected from the group consisting of boric acid, borax, fluoroboric acid, ammonium fluoroborate, alkali metal borohydride, alkaline earth metal borohydride, boric oxide, boron halide and mixtures thereof.

33. A brine, as recited in claim 31, wherein said metal halide salt is calcium chloride.

34. A brine, as recited in claim 31, wherein said metal halide salt is calcium bromide.

35. A brine, as recited in claim 31, wherein said borate anion producing compound is boric acid.

* * * * *